United States Patent [19]
Stegelman et al.

[11] 3,857,012
[45] Dec. 24, 1974

[54] METHOD OF REPAIRING SPINNERETTES

[75] Inventors: Albert F. Stegelman, Greenville; Arnold Michalski, Piedmont, both of S.C.

[73] Assignee: Phillips Fiber Corporation

[22] Filed: Aug. 20, 1973

[21] Appl. No.: 389,734

[52] U.S. Cl.................. 219/69 M, 204/224 M
[51] Int. Cl............................................. B23k 9/16
[58] Field of Search ................ 219/69 E, 69 M, 77; 204/224 M

[56] References Cited
UNITED STATES PATENTS
2,416,125  2/1947  Simpson ........................ 219/69 M
3,240,914  3/1966  Hill et al. ...................... 219/69 M
3,760,141  9/1973  Espana et al. ..................... 219/77

*Primary Examiner*—J. V. Truhe
*Assistant Examiner*—Hugh D. Jaeger

[57] ABSTRACT

A method of repairing damaged spinnerettes having a damaged area on the face thereof, comprising machining said damaged area by electrical discharge machining.

13 Claims, 6 Drawing Figures

METHOD OF REPAIRING SPINNERETTES

This invention relates to the repair of spinnerettes. The capillaries in spinnerettes employed for melt spinning of synthetic fibers are required to have an essentially uniform length, an essentially uniform shape, e.g., circular or other shape, and are also required to have a clean damage-free face where the extruded fibers leave the surface of the spinnerette. During use, spinnerettes frequently become damaged as by scratching during handling, by accidental blows during installation, or by scratches imparted by the brass "wipesticks" which are customarily used to periodically wipe the face of the spinnerette during spinning operations so as to remove degraded polymer therefrom.

The damage or damaged areas on the face of the spinnerette can comprise indentations or other irregularities ranging from minor barely visible scratches up to about 0.0003 inch deep, to indentations, grooves, etc. having a depth in the order of 0.0015 to 0.002 inch, or greater, and a corresponding width. Said damage is particularly serious when it crosses or touches, or is located within about one capillary diameter, of a capillary exit. In such instances the spinnerette must be repaired or replaced as soon as possible. When the capillary exit is damaged or deformed, the shape and quality of the fiber filaments are directly and adversely affected. Damaged capillary exits can also lead to so-called "doglegging" (improper extrusion) of the extruded filaments which is highly undesirable. Indentations such as scratches, grooves, and other irregularities in the face of the spinnerette present damaged areas where polymer can collect and become degraded because it cannot be wiped from the face of the spinnerette. While damaged areas crossing or touching a capillary exit must be promptly repaired, it is also desirable to repair damaged areas located on the face of the spinnerette between capillary exits. Unless otherwise specified, the term "indentation" is employed generically herein to include scratches, grooves, and other marks or irregularities which destroy the smooth surface of the spinnerette face or deform the capillary exit.

Such damaged areas cannot be efficiently repaired by refinishing the face of the spinnerette by means of a lapping tool. This is because the exit face of the spinnerette becomes slightly convex during use and mechanical lapping shortens the length of the capillaries in the center of the spinnerette. In some instances the damaged area can be spot polished with abrasive stones, etc. However, this method is very slow, requiring on the order of one hour's time per capillary, and requiring considerable operator skill.

The present invention provides a solution for the above described problems. We have discovered that electrical discharge machining, referred to hereinafter for convenience by the designation EDM, can be used to repair spinnerettes having damaged areas on the face thereof. Thus, broadly speaking, the concept of our invention resides in machining the damaged face of a spinnerette by EDM.

Thus, according to the invention, there is provided a method for repairing a spinnerette having a damaged area on its face, which method comprises machining said damaged face by electrical discharge machining.

EDM is well known. For example, see U.S. Pat. No. 3,475,312, issued Oct. 8, 1969, and U.S. Pat. No. 2,778,924, issued Jan. 22, 1957, and the patents referred to therein. A good description of the fundamentals of EDM is given in the publication "Fundamentals of EDM", published by Elox Division of Colt Industries (1964), Griffith Street, Davidson, North Carolina 28036.

However, as will be evident to those skilled in the art in view of this disclosure, it was surprising and unexpected that EDM can be used with the precision and accuracy required in removing, or machining away, metal from the face of a spinnerette within the close tolerances required in repairing a spinnerette. In the methods of the invention, EDM is employed in a manner which, insofar as we are aware, has not heretofore been employed in the art, and to obtain results which could formerly be obtained only with much greater expenditure of manpower. Furthermore, the methods of the invention result in an approximately threefold increase in the spinnerette life.

The steps utilized in the methods of the invention will depend upon the severity of the damage to the spinnerette. In some instances only an EDM treatment is required. In other instances involving more severe damage, we have found that for best results it is desirable to incorporate one or more other steps prior to, or in preparation for, said EDM treatment. Said other steps are discussed further below.

Figure 3:
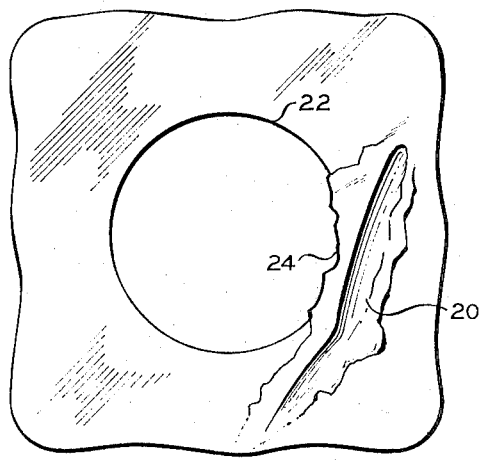
FIG. 3 is a diagrammatic representation of an actual photomicrograph (at a magnification of 120 times) of a damaged capillary exit and the area adjacent thereto.
Figure 4:
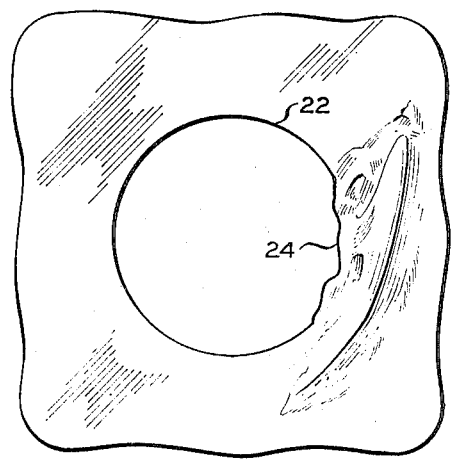
Figure 5:
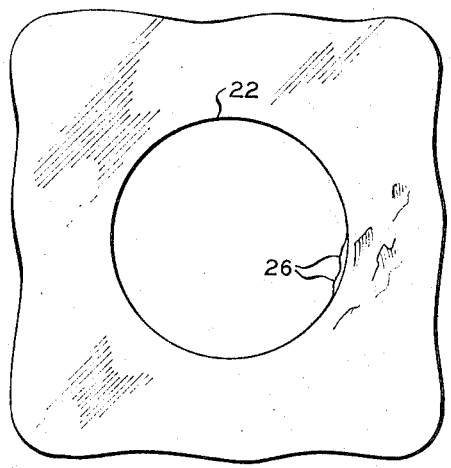
Figure 6:
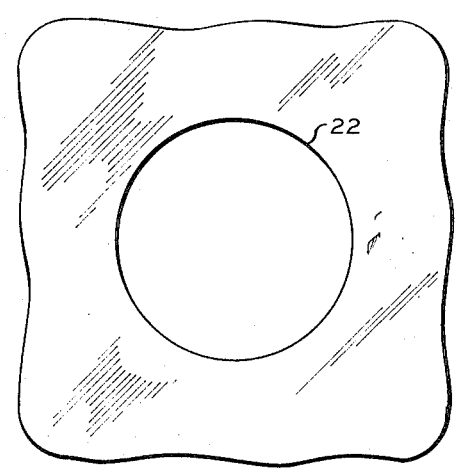

FIGS. 4, 5, and 6 are diagrammatic representations of actual photomicrographs (at a magnification of 120 times) of the capillary exit of FIG. 3 showing various stages of repair in accordance with the invention.

Figure 1:
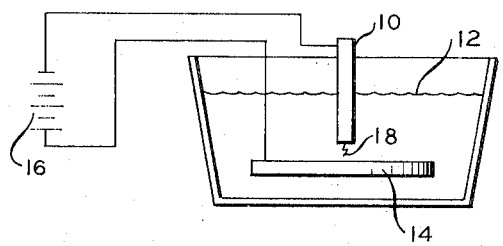
FIG. 1 is a diagrammatic illustration of the basic elements of an EDM machine.

Referring now to the drawings, wherein like numerals are employed to denote like elements, the invention will be more fully explained. EDM comprises a process of metal removal from a work piece by means of an electrical discharge (spark) between an electrode and said work piece in the presence of a dielectric (coolant). For example, in FIG. 1 an electrode 10 having an end area perpendicular to its axis is disposed in a bath of dielectric liquid 12. A spinnerette 14 is disposed with the damaged area on its face adjacent and essentially perpendicular to, but spaced apart from the end area of said electrode. Said spinnerette 14 is mounted on a movable table (not shown) by means of which the damaged area on the face of the spinnerette can be caused to traverse said end area of said electrode. Said electrode and said spinnerette are each connected to a suitable power supply 16. During said traversing movement a high frequency discharge (electric spark 18) is maintained between said electrode and said spinnerette. Said spark discharge is generated by a suitable capacitive or other discharge device (not shown) which comprises a part of an EDM machine. Said electrode is fed toward the spinnerette by means of a servo mechanism (not shown) which is adapted to maintain substantially constant the gap width (discharge gap) between the electrode and the spinnerette. A jet of the dielectric liquid flushes particles of the removed metal from the work area. Said liquid also serves as a coolant.

We have discovered that said servo mechanism will permit the electrode to follow the convex surface of the spinnerette face as it is moved in a plane under the electrode. We have also discovered that by moving either the spinnerette or the electrode relative to the other, and traversing the other, a distance which is less than the traverse dimension of the end zone of the electrode so as to maintain at least a portion of the damaged area of the spinnerette opposite the end area of the electrode while maintaining the high frequency electrical spark discharge, that the surface finish in said damaged area can be "feathered" or blended into the original surface of the spinnerette face. This is a presently preferred procedure for use in the practice of the invention so as to obtain the best results.

For example, when employing an electrode having a diameter or other transverse dimension of about ⅛ inch on the end area thereof, one would move the spinnerette in a to and fro manner about 1/16 inch in at least two directions about 90° apart in a plane beneath the end area of the electrode. This example is given by way of illustration only and is not intended to be unduly limiting on the invention. It is within the scope of the invention to employ larger or smaller dimensioned electrodes and thus permit the spinnerette to be moved a greater or smaller distance. It is presently preferred that movement of the spinnerette be accomplished manually by an operator. However, it is within the scope of the invention to automate the movement of the spinnerette. It is also within the scope of the invention to maintain the spinnerette stationary and move the electrode so as to traverse the damaged area on the spinnerette.

In EDM the rate of metal removal and the surface finish can be controlled by controlling discharge voltage, current, and frequency of the electrical discharge (spark). The above discussed servo mechanism senses the discharge voltage and uses this to control the discharge gap, which in turn controls or determines the actual discharge voltage.

The rate of metal removal in EDM is dependent upon the amount of electric current used. As the current is increased for a particular discharge (spark) frequency, the metal removal rate increases because each spark contains more energy. For example, for a given discharge frequency, when the current is doubled the amount of energy in the spark is doubled and rate of metal removal is doubled. In the practice of the invention, we have found that when using a supply voltage within the range of from about 30 to about 50 volts, the current can range from about 10 to about 3 milliamps, respectively. At 40 volts the current can be in the range of 6 to 7 milliamps. The successful operation of an EDM machine at such low current values in repairing spinnerettes was indeed surprising when one considers that such machines are customarily operated with much greater current values, e.g., at least one ampere, and up to 100 amperes.

The surface finish obtained in the practice of the invention is controlled by controlling the discharge frequency, i.e., the number of sparks per second between the electrode and the spinnerette. For a given current value, a given amount of energy is available per unit of time. Thus, for a greater number of sparks per second, there will be less energy per spark, and the amount of metal removed per spark will be less. Since each spark in removing metal leaves a cavity, it is desirable for a smooth finish to operate at the higher frequencies so as to produce smaller cavities. In the repair of spinnerettes in accordance with the invention, frequencies in the order of 65,000 to 260,000, or higher, cycles per second, are presently preferred. It is more preferred that the frequency be at least about 200,000 cycles per second. We have found that frequencies in the order of 260,000 cycles per second give good results.

Voltages in the range of 30 to 60, preferably 40 to 45, volts can be used in the practice of the invention. The voltage, per se, is of less importance than the other operating variables discussed above. Sufficient voltage must be used to cause the discharge (spark) to jump the gap between the electrode and the spinnerette. For any given voltage supply setting, the above discussed servo mechanism which feeds the electrode toward the spinnerette senses the discharge voltage as the spinnerette traverses the end area of the electrode and moves the electrode toward and away from the spinnerette to control the discharge gap, and thus compensate for unevenness in spinnerette surface, as in a damaged area thereof. By actual measurement we have determined the following relationship between voltage and discharge gap.

| Voltage | Discharge Gap |
| --- | --- |
| 50 | 0.0014 ± 0.001 inch |
| 40 | 0.0012 ± 0.001 inch |
| 20 | 0.00009 ± 0.0006 inch |
| 10 | 1.00005 ± 0.0005 inch |

The ranges given above for the various operating variables are not intended to be unduly limiting on the invention. Said ranges are included here primarily as a guide to those skilled in the art, and the use of current values, discharge frequencies, voltages, and discharge gaps outside said ranges is within the scope of the invention. There can be some variation in said operating variables with variation in electrode material and the material of which the spinnerette is made.

As a further guide to those skilled in the art, but not by way of limitation on the invention, we have found that the average EDM treatment time will be in the order of 9 to 12 minutes, per damaged capillary and adjacent damaged area, under the above-described conditions. Similarly, a short or light EDM treatment will usually be in the order of 2 to 5 minutes.

Figure 2:
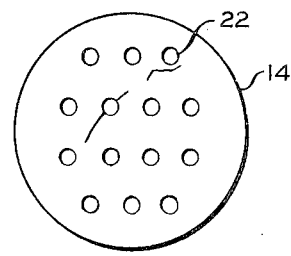
FIG. 2 is a diagrammatic illustration of a spinnerette face showing two types of damage thereto; e.g., across a capillary exit, adjacent a capillary exit.

Spinnerettes are well known articles in the synthetic fiber industry. Most commonly, spinnerettes are round in shape as illustrated in FIG. 2, but can be made in any suitable shape, e.g., square, rectangular, etc. Commonly, they will have from 26 to 136 capillaries therein, depending upon the process in which they are employed, but can have more or less capillaries, arranged in various patterns. The illustration in FIG. 2 is diagrammatic only and a small number of capillaries is shown for sake of simplicity. Said capillaries are most commonly round but can have other shapes, square, rectangular, trilobal, etc. Commonly, the capillaries in said spinnerettes will have diameters, or effective outlet cross sections, in the range of 0.0005 to 0.030 inch, more commonly, in the range of 0.0009 to 0.015 inch. Said spinnerettes are usually made of metals, such as the various stainless steels, but can be made of other suitable materials. The invention is applicable to, and can be employed in the repair of, spinnerettes made from any electrically conductive material.

Any suitable type of electrode can be employed in the practice of the invention. Solid cylindrical electrodes are presently preferred. However, electrodes of other shapes, e.g., square, triangular, etc., can be employed. It is also within the scope of the invention to employ tubular or hollow electrodes. It is presently preferred that said electrodes have a diameter, or other end area transverse dimension, of about 1/8 inch. However, it is within the scope of the invention to employ electrodes having larger or smaller end area dimensions. Said electrodes can be made of any suitable electrically conductive material. One presently preferred material is a tellurium-copper alloy. However, other materials which can be used include tungsten, tungsten alloys, graphite, copper, brass, and others.

The EDM is carried out in the presence of a dielectric liquid which forms a dielectric barrier between the electrode and the spinnerette at the discharge gap, serves as a coolant, and flushes eroded particles out of the discharge gap. Any suitable dielectric liquid can be used in the practice of the invention. Specially prepared and refined oils having known characteristics are commercially available and are usually used. However, other liquids such as distilled water can be used. A presently preferred dielectric liquid for use in the practice of the invention is Eloxol No. 13, a specially prepared and refined oil sold by the Elox Division of Colt Industries.

The following example will serve to further illustrate the invention. Said example illustrates the repair of a spinnerette wherein the damage was severe enough to make it desirable to employ steps or operations in addition to the EDM treatment, e.g., certain pretreatment steps prior to EDM.

EXAMPLE

A damaged spinnerette made of a stainless steel, having a face diameter of 82 millimeters and having 68 capillaries of 0.0135 inch diameter therein was repaired in accordance with the invention. The face of said spinnerette had a lapped surface finish of about 5 microinches rms (root mean square). The damage to the spinnerette comprised an indentation 20 having a depth of about 0.0015-0.002 inch and a length of about 0.014 inch in the face thereof. Said indentation was adjacent one of said capillaries, similarly as shown for capillary 22 in FIG. 2, and was sufficiently close to said capillary to cause deformation of the capillary exit, similarly as shown at 24 in FIG. 3.

Said damage was severe enough to require a pretreatment to restore metal to the damaged area. This was done by staking the face of the spinnerette adjacent said indentation to move metal into said indentation. Said staking step comprised pressing on the spinnerette face in the area of the damage with a sharp pointed tool of hardened alloy steel. The pressure of said tool adjacent the indentation caused the bottom of the indentation to be raised, and produced a series of small nonconnected indentations having diameters and depths in the order of 0.002 to 0.003 inch in the damaged area. The staked areas were then scratched or abraded lightly with a sharpened flexible tool to reduce raised areas. Any suitable tool or abrasive material can be used for this purpose. FIG. 4 is a diagrammatic representation of the damaged area after this treatment. Because of the small dimension of the capillary and the damaged area, these operations were carried out with 40 to 60 power magnification.

An EDM treatment was then carried out on the thus pretreated spinnerette. The EDM was carried out at a voltage of 40 volts, and a discharge frequency of 260,000 cycles per second, which will draw a current of about 5 milliamps, for about 10 minutes, and employing a 1/8 inch cylindrical solid electrode made of a tellurium-copper alloy. During said EDM treatment the spinnerette was moved, relative to the end area of said electrode, in a to and fro manner about 1/16 inch in at least two directions about 90° apart.

The capillary exit was then broached with a round broaching tool to restore the capillary to size and restore the roundness thereof.

Examination of the capillary exit and damaged area, under magnification, after said EDM treatment and said broaching treatment revealed the presence of two small burrs 26 on the periphery of the capillary exit, and some minor residual stake marks. FIG. 5 is a diagrammatic representation of the appearance of the capillary and damaged area at this stage of the repair.

The spinnerette was then given a second mild EDM treatment, under substantially the same operating conditions as described above for a period of 1 to 2 minutes to complete the repair. FIG. 6 is a diagrammatic representation of the appearance of the spinnerette after said second EDM treatment. For this particular spinnerette, this completed the repair. The finished surface in the repaired area was about 8 to 10 microinches rms, and less than 0.0005 inch was removed from the original surface.

As indicated above, the particular steps, and the number thereof, employed in the repair methods of the invention will depend upon the severity of the damage to the spinnerette. In some instances where the amount of damage is relatively small, e.g., a minor scratch having a depth in the order of up to 0.0002 to 0.0003 inch, an EDM treatment only can be sufficient. In other instances involving more severe damage, other steps in addition to EDM are desirable, such as one or more of the steps described in the above example.

It is to be definitely understood that said other steps employed in the above example are not always required. For example, there can be instances where the damage is severe enough to make a metal restoration step, e.g., staking, desirable, but where the damage does not affect the capillary exit, the broaching step may not be necessary. In other instances, e.g., where only a light scratch touches or crosses the capillary exit, the broaching step would probably be desirable, but a metal restoration may not be necessary.

The above described staking operation is the presently preferred metal restoration step. However, other metal restoration steps such as metal deposition in deep indentations as by welding or metalizing by flame spraying can be used. In such instances it will be desirable to plug the capillaries with a suitable subsequently removable material, e.g., a suitable ceramic material.

The scratching or abrading step subsequent to the metal restoration step may or may not be necessary or desirable, depending upon the nature and extent of said metal restoration step.

It will also be understood that any of the above described steps in the methods of the invention can be repeated at any stage of the repair operation. For example, after a staking step and a first EDM step, it may be desirable to repeat a light staking step and a short second EDM treatment. Or, said light staking step could be omitted and a light scratching or abrading step applied before the second EDM treatment.

A number of advantages are realized or obtained in the practice of the invention. One important advantage is that the use of EDM makes it possible to restore the surface of the spinnerette face, and the finish thereof, without rounding the sharp edges of the capillary exit and without producing a significant decrease in the length of the capillaries in the spinnerette. Another important advantage is that the life of the spinnerette is increased. When spinnerettes are repaired according to conventional methods employing lapping machines and surface grinding, about three times is the maximum number of times a spinnerette can be repaired before it must be discarded. We have found that in using the methods of the invention that spinnerettes can be repaired on an average of about 10 times. Still another important advantage is a marked reduction in the manpower and time required, i.e., about 50 percent of the time required when using conventional methods.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A method for repairing a spinnerette having on its face a damaged area bordered by an undamaged area, which method comprises:
electrically removing metal from said damaged area and said bordering undamaged area of said face by electrical discharge machining and thereby blending the surface of said damaged area into the surface of said undamaged area.

2. A method according to claim 1 wherein:
the electrical discharge in said machining is provided by a current within the range of from about 3 to about 10 milliamps, at a voltage within the range of from about 30 to about 60 volts, and at a discharge frequency within the range of from about 65,000 to about 260,000 cycles per second.

3. A method according to claim 2 wherein the damage to said spinnerette includes damage to at least one capillary therein, and said method comprises, in combination, the additional step of reshaping said capillary subsequent to said electrical discharge machining by inserting a broaching tool into said capillary from the face of the spinnerette so as to restore the opening of said capillary to its original size and shape.

4. A method for repairing a spinnerette having on its face a damaged area comprising an indentation bordered by an undamaged area, which method comprises, in combination, the steps of:
a. restoring metal into said indentation;
b. installing said spinnerette in an electrical discharge machining apparatus subsequent to said step (a); and
c. electrically removing metal from said damaged area and said bordering undamaged area of said face by electrical discharge machining and thereby blending the surface of said damaged area into the surface of said undamaged area.

5. A method according to claim 4 wherein:
said step (a) comprises moving metal into the bottom of said indentation by a staking operation comprising pressing on the face of the spinnerette in said undamaged area adjacent said indentation;
the marks or indentations produced by said step (a) are not more than about 0.003 inch in depth; and less than about 0.0005 inch of metal is removed from the original surface of the face of said spinnerette.

6. A method according to claim 4 wherein, in said step (c):
there is provided in said electrical discharge machining apparatus an electrode having an end area perpendicular to its axis;
said spinnerette is disposed with said damaged area on its face adjacent and essentially perpendicular to, but spaced apart from, said end area of said electrode;
one of said spinnerette and said electrode is moved relative to and traverses the opposing area of the other a distance less than the transverse dimension of said end area of said electrode so as to maintain at least a portion of said damaged area opposite said end area of said electrode; and
a high frequency electrical spark discharge is maintained between said electrode and said spinnerette during said movement.

7. A method according to claim 6 wherein said spinnerette is moved relative to said electrode and said traversing movement is carried out in a to and fro manner in at least two directions about 90° apart in a plane beneath said end area of said electrode.

8. A method according to claim 7 wherein said electrical discharge is provided by a current within the range of from about 3 to about 10 milliamps, at a voltage within the range of from about 30 to about 50, volts and a frequency within the range of from about 65,000 to about 260,000 cycles per second.

9. A method according to claim 4 wherein said electrical discharge is provided by a current within the range of from about 3 to about 10 milliamps, at a voltage within the range of from about 30 to about 50, and a frequency within the range of from about 65,000 to about 260,000 cycles per second.

10. A method for repairing a spinnerette having on its face a damaged area comprising an indentation bordered by an undamaged area, which method comprises, in combination, the steps of:
a. restoring metal into said indentation;
b. reducing or lowering any raised areas produced in said step (a) by scratching or abrading the area comprising said restored metal;
c. installing said spinnerette in electrical discharge machining apparatus subsequent to said step (b); and
d. electrically removing metal from said damaged area and said bordering undamaged area of said face by electrical discharge machining and thereby blending the surface of said damaged area into the surface of said undamaged area.

11. A method according to claim 10 wherein said indentation touches the edge of, or crosses, at least one capillary in said spinnerette, and said method comprises, in further combination, the step of:

e. reshaping said capillary by inserting a broaching tool into said capillary from the face of the spinnerette so as to restore the opening of said capillary to its original size and shape.

12. A method according to claim 11 wherein said method comprises, in further combination, the step of:

f. after said step (e), electrically removing metal from the area around said capillary opening by electrical discharge machining so as to remove burrs or other irregularities which may remain after said step (e).

13. A method according to claim 11 wherein:

the metal restoration of said step (a) comprises a staking operation which comprises moving metal into the bottom of said indentation by pressing on the face of the spinnerette in said undamaged area adjacent said indentation;

the marks or indentations produced by said step (a) are not more than about 0.003 inch in depth; and less than about 0.0005 inch of metal is removed from the original surface of the face of said spinnerette.

* * * * *